US012702622B2

(12) United States Patent
Vogt et al.

(10) Patent No.: US 12,702,622 B2
(45) Date of Patent: Aug. 11, 2026

(54) AMPULE OPENER WITH MULTIFUNCTIONAL PLUNGER

(71) Applicant: Heraeus Medical GmbH, Wehrheim (DE)

(72) Inventors: Sebastian Vogt, Wehrheim (DE); Thomas Kluge, Wehrheim (DE)

(73) Assignee: Heraeus Medical GmbH, Wehrheim (DE)

( * ) Notice: Subject to any disclaimer, the term of this patent is extended or adjusted under 35 U.S.C. 154(b) by 79 days.

(21) Appl. No.: 18/680,711

(22) Filed: May 31, 2024

(65) Prior Publication Data

US 2024/0407971 A1 Dec. 12, 2024

(30) Foreign Application Priority Data

Jun. 6, 2023 (EP) .................................... 23177508

(51) Int. Cl.
*A61J 1/14* (2023.01)
*A61J 1/06* (2006.01)

(52) U.S. Cl.
CPC ............. *A61J 1/1443* (2013.01); *A61J 1/065* (2013.01)

(58) Field of Classification Search
CPC ...... A61J 1/1443; A61J 1/065; B01F 35/7131
See application file for complete search history.

(56) References Cited

U.S. PATENT DOCUMENTS

| | | | |
|---|---|---|---|
| 4,671,263 | A | 6/1987 | Draenert |
| 4,973,168 | A | 11/1990 | Chan |
| 5,100,241 | A | 3/1992 | Chan |
| 5,344,232 | A | 9/1994 | Nelson et al. |
| 5,586,821 | A | 12/1996 | Bonitati et al. |
| 5,588,745 | A | 12/1996 | Tanaka et al. |
| 5,624,184 | A | 4/1997 | Chan |
| 5,997,544 | A | 12/1999 | Nies et al. |
| 6,033,105 | A | 3/2000 | Barker et al. |
| 6,709,149 | B1 | 3/2004 | Tepic |
| 7,073,936 | B1 | 7/2006 | Jonsson |
| 8,662,736 | B2 | 3/2014 | Vogt et al. |

(Continued)

FOREIGN PATENT DOCUMENTS

| | | | |
|---|---|---|---|
| DE | 3640279 | A1 | 6/1987 |
| DE | 19532015 | A1 | 3/1997 |
| DE | 19718648 | A1 | 11/1998 |

(Continued)

OTHER PUBLICATIONS

Translation of DE-102016121607-A1 (Year: 2018).*

*Primary Examiner* — Jason K Niesz
(74) *Attorney, Agent, or Firm* — Dicke, Billig & Czaja, PLLC

(57) ABSTRACT

A device for dispensing a liquid from a glass ampule, comprising a housing, a holder arranged in the housing for receiving a glass ampule, a projection which is arranged in the housing and designed and configured to break open a glass ampule which can be received in the holder, an outlet for dispensing a liquid from the housing, and a plunger movably arranged in the housing, wherein the plunger is designed and configured to break open a glass ampule, which can be received in the holder, by the pressure of the glass ampule against the projection, and to pump the liquid from the glass ampule out of the outlet of the housing.

14 Claims, 9 Drawing Sheets

(56) References Cited

U.S. PATENT DOCUMENTS

| | | | | |
|---|---|---|---|---|
| 2012/0055580 A1* | 3/2012 | Greter | .................. | A61J 1/2096<br>141/234 |
| 2021/0246009 A1* | 8/2021 | Smith | .................. | A61J 1/2096 |

FOREIGN PATENT DOCUMENTS

| | | | | |
|---|---|---|---|---|
| DE | 69812726 T2 | 2/2004 | | |
| DE | 102009031178 B3 | 9/2010 | | |
| DE | 102016121607 A1 * | 5/2018 | ........... | A61L 24/043 |
| EP | 0380867 B1 | 8/1997 | | |
| EP | 0692229 B1 | 12/1999 | | |
| EP | 1005901 A2 | 6/2000 | | |
| EP | 1016452 A2 | 7/2000 | | |
| EP | 1020167 A2 | 7/2000 | | |
| EP | 0796653 B1 | 5/2004 | | |
| EP | 1741413 B1 | 9/2009 | | |
| EP | 2404864 B1 | 4/2017 | | |
| EP | 3054880 B1 | 1/2020 | | |
| EP | 3093067 B1 | 1/2020 | | |
| EP | 3527157 B1 | 9/2020 | | |
| WO | 9416951 A1 | 8/1994 | | |
| WO | 9426403 A1 | 11/1994 | | |
| WO | 9718031 A1 | 5/1997 | | |
| WO | 9967015 A1 | 12/1999 | | |
| WO | 2010012114 A1 | 2/2010 | | |

* cited by examiner

AMPULE OPENER WITH MULTIFUNCTIONAL PLUNGER

CROSS-REFERENCE TO RELATED APPLICATIONS

This application claims priority pursuant to 35 U.S.C. 119(a) to European Application No. 23177508.1, filed Jun. 6, 2023, which application is incorporated herein by reference in its entirety.

FIELD OF THE INVENTION

The present invention relates to the field of medical technology, in particular to devices for the preparation of bone cement. In particular, devices for opening glass ampules are described which are suitable for dispensing a liquid from such glass ampules. For example, a monomer liquid can be dispensed to a powder component for producing a polymethylmethacrylate bone cement by means of the devices described herein. The devices described herein are generally used for storing and opening glass ampules and for dispensing a liquid contained therein.

TECHNICAL BACKGROUND

The devices described herein can preferably be used for storing and opening ampules and for transferring monomer liquid into pre-filled polymethylmethacrylate bone cement mixture systems. Further subject matters of the invention are polymethylmethacrylate bone cement mixture systems pre-filled with the cement components bone cement powder and monomer liquid, which systems comprise the device for storing and opening ampules. The devices described herein can preferably be used for so-called "full-prepacked mixing systems" for polymethylmethacrylate bone cement, which comprise the required components for producing a bone cement in separately sealed containers.

Polymethylmethacrylate (PMMA) bone cements are based on the fundamental work of Charley. PMMA bone cements are composed of a liquid monomer component and a powder component. The monomer component generally contains the monomer methyl methacrylate and an activator dissolved therein (N,N-dimethyl-p-toluidine). The powder component, also referred to as bone cement powder, contains one or more polymers produced on the basis of methyl methacrylate and comonomers, such as styrene, methyl acrylate or similar monomers, by polymerization, preferably suspension polymerization, a radiopaque agent and the initiator dibenzoyl peroxide. When the powder component is mixed with the monomer component, a plastically deformable dough, the actual bone cement dough, is produced as a result of swelling of the polymers of the powder component in the methyl methacrylate. When the powder component is mixed with the monomer component, the activator N,N-dimethyl-p-toluidine reacts with dibenzoyl peroxide to form radicals. The radicals formed initiate the radical polymerization of the methyl methacrylate. As the polymerization of the methyl methacrylate progresses, the viscosity of the cement dough increases until the cement dough solidifies.

Polymethylmethacrylate bone cements can be mixed in suitable mixing beakers with the aid of spatulas by mixing the cement powder with the monomer liquid. Air bubbles may be incorporated in the bone cement dough, which can negatively influence the mechanical properties of the hardened bone cement.

In order to avoid air inclusions in the bone cement paste, a plurality of vacuum cementing systems have been described, of which the following are mentioned by way of example: U.S. Pat. Nos. 6,033,105A, 5,624,184A, 4,671,263A, 4,973,168A, 5,100,241A, WO99/67015A1, EP1 020 167A2, U.S. Pat. No. 5,586,821A, EP1 016 452A2, DE36 40 279A1, WO94/26403A1, EP1 005 901A2, and U.S. Pat. No. 5,344,232A.

A further development in cementing technology is represented by cementing systems in which both the cement powder and the monomer liquid are already packaged in separate compartments of the mixing systems and are first mixed with one another in the cementing system immediately before application of the cement. Such closed full-prepacked mixing systems were described in the patents EP0380867B1, EP0796653B1, EP0692229B1, DE102009031178B1, U.S. Pat. Nos. 5,997,544B1, 6,709,149B1, DE69812726B1, and U.S. Pat. No. 5,588,745B1, WO9416951A1, DE19718648A1, EP1741413B1, EP3054880B1, DE102009031178B3, U.S. Pat. No. 8,662,736B2, and EP3093067B1.

The monomer liquid of PMMA bone cement can advantageously be stored in glass ampules and also in plastic composite bags and also in metallized plastic composite bags over periods of years. Glass ampules are particularly suitable in this case because they completely prevent the monomer liquid from escaping from the ampule by diffusion.

In order to remove the monomer liquid from a glass ampule, however, the ampule head has to be detached from the ampule body and removed. A series of patents specifications were known for opening glass ampules in closed ampule holders. Devices for opening ampules have been disclosed in documents DE19532015A1, WO9718031A1, and WO2010012114A1.

EP2404864B1 discloses a device in which an ampule is arranged in an ampule holder and wherein the ampule holder is elastically deformable in the region of the ampule neck. The ampule holder is not deformable in the region of the ampule head and the ampule body. By bending the ampule holder over the elastically deformable portion of the ampule holder, which has a hinge function, the ampule head can be pressed against the non-deformable wall of the ampule holder. The ampule head can thereby break off and fall onto a screen. The monomer liquid can then flow out of the opened ampule through the screen. For the device described there to function, it is advantageous that it can be connected with mechanical stability to a mixing system to be supplied with monomer liquid because a considerable tensile load can occur at the attachment to the mixing system during the bending process.

Preferred Embodiments

The object of the present invention is to solve one or more of the problems described above and further problems of the prior art. For example, the invention facilitates a simple and reliable dispensing of a liquid from a glass ampule. Furthermore, the present invention provides a method for dispensing a liquid from a glass ampule.

These objects are achieved by the methods and devices described herein, in particular those which are described in the claims.

Preferred embodiments of the invention are described below.

A first aspect relates to a device for dispensing a liquid from a glass ampule, comprising a housing, a holder arranged in the housing for receiving a glass ampule with a liquid, a projection arranged in the housing and being designed and configured to break open a glass ampule which can be received in the holder, an outlet for dispensing a liquid from the housing, and a plunger movably arranged in the housing, wherein the plunger is designed and configured to break open a glass ampule, which can be received in the holder, by the pressure of the glass ampule against the projection, and to pump the liquid from the glass ampule out of the outlet of the housing.

A second embodiment describes a device according to the first embodiment described above, further comprising a valve which is configured to allow air to flow into the housing from the outside in order to subsequently pump a liquid from a glass ampule, which is broken open in the device, out of the housing by the pressure of the plunger onto the air flowing into the housing.

A third embodiment relates to a device according to the second embodiment, wherein the valve is a one-way valve, preferably a ball valve, lip valve, or plate valve.

A fourth embodiment relates to a device according to any of the preceding embodiments, further comprising a receptacle, which is arranged in the housing and is configured to receive a portion of a glass ampule which was broken off by the effect of the plunger.

A fifth embodiment relates to a device according to embodiment 4, further comprising a screen, which is arranged adjacent to the receptacle and is configured to retain fragments from a glass ampule broken open in the device.

A sixth embodiment relates to a device according to any of the preceding embodiments, wherein the device further comprises a collection region in order to receive liquid from a glass ampule broken open in the device.

A seventh embodiment relates to a device according to any of the preceding embodiments, wherein the device is designed and configured for mixing bone cement, wherein the device preferably further contains a powder component for preparing a bone cement.

An eighth embodiment relates to a device according to any of the preceding embodiments, wherein the device comprises a first end and a second end, wherein the first end is arranged opposite the second end, wherein the plunger is arranged at the first end and the outlet is arranged at the second end.

A ninth embodiment relates to a device according to embodiment 8, wherein the outlet defines a longitudinal axis of the device (L), wherein the device is configured to dispense a liquid along said longitudinal axis, wherein the holder is arranged at an angle $\alpha$ of 0° to 50° with respect to said longitudinal axis (L).

A tenth embodiment relates to a device according to any of the preceding embodiments, wherein the outlet is designed and configured for connection to a container, wherein the container is preferably configured to receive a powder component of a bone cement.

An eleventh embodiment relates to a device according to any of the preceding embodiments, wherein the device is designed and configured to pump the entire contents of a glass ampule received in the holder out of the outlet of the housing with a single stroke of the plunger.

A twelfth embodiment relates to a device according to any of the preceding embodiments, wherein a glass ampule can be fastened or fixed in the holder in a force-fitting, form-fitting or integrally bonded manner, preferably is fastened or fixable by adhesive bonding or clamping.

A thirteenth embodiment relates to a device according to any of the preceding embodiments, wherein the device is designed and configured for simultaneously breaking open and dispensing liquid from two glass ampules.

A fourteenth embodiment relates to a device according to any of the preceding embodiments, wherein arranged in the holder is a glass ampule 201, which comprises an ampule neck having an annular predetermined breaking point, wherein the inner diameter of the predetermined breaking point is preferably 4 to 7 mm.

A further aspect relates to a method for dispensing a liquid from a glass ampule using a device as described above, wherein the method comprises the following steps, fixing the glass ampule in a holder of the device;

breaking open the glass ampule by pressing the glass ampule against a projection of the device with the aid of a plunger of the device;

dispensing the liquid from the broken-open glass ampule through an outlet of the device by pumping with the aid of the plunger.

DETAILED DESCRIPTION

Figure 1:
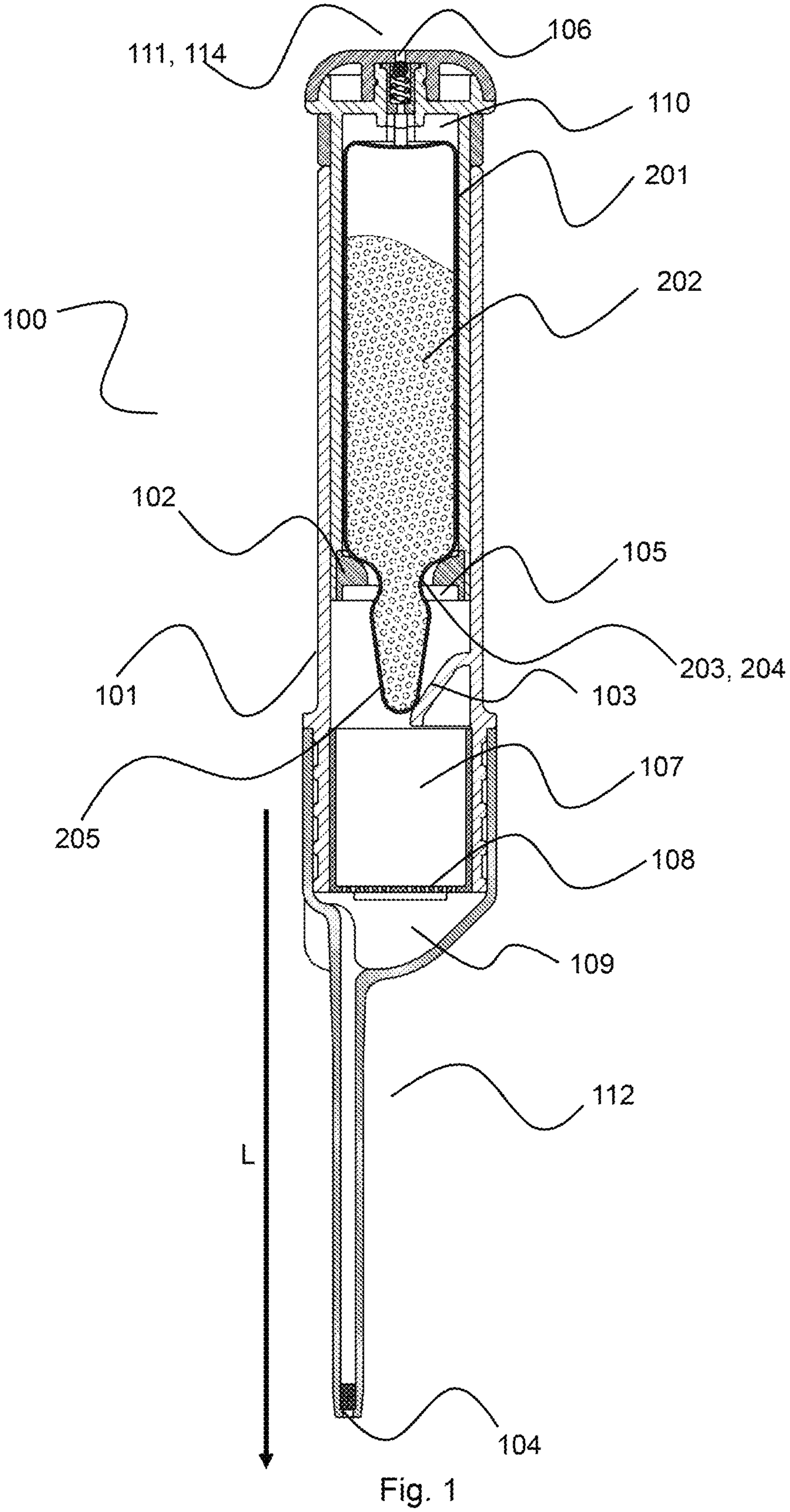
Fig. 1 illustrates a lateral cross-sectional view of a device in accordance with one embodiment.

With respect to the embodiments described herein, the elements of which “have,” or “comprise,” a particular feature (for example, a material), in principle, a further embodiment is always contemplated in which the relevant element consists solely of the feature, i.e., does not comprise any other constituents. The word “comprise” or “comprising” is used herein synonymously with the word “have” or “having.”

In one embodiment, if an element is denoted by the singular, an embodiment is also contemplated in which more than one such element is present. The use of a term for an element in the plural in principle also encompasses an embodiment in which only a single corresponding element is included.

Unless otherwise indicated or clearly excluded from the context, it is possible in principle, and is hereby clearly contemplated, that features of different embodiments may also be present in the other embodiments described herein. Likewise, it is contemplated in principle that all features described herein in connection with a method are also applicable to the products and devices described herein, and vice versa. All such considered combinations are not explicitly listed in all instances, simply in order to keep the description brief. Technical solutions known to be equivalent to the features described herein are also intended in principle to be encompassed by the scope of the invention.

A first aspect relates to a device for dispensing a liquid from a glass ampule, comprising

- a housing,
- a holder arranged in the housing for receiving a glass ampule,
- a projection arranged in the housing and being designed and configured to break open a glass ampule which can be received in the holder,
- an outlet for dispensing a liquid from the housing, and
- a plunger movably arranged in the housing, wherein the plunger is designed and configured to break open a glass ampule, which can be received in the holder, by the pressure of the glass ampule against the projection, and to pump the liquid from the glass ampule out of the outlet of the housing.

The device preferably comprises a first end and a second end, wherein the first end and the second end are preferably arranged opposite one another. The second end is preferably configured to be oriented downwards during the use of the device in order to dispense the liquid contained in a glass ampule downwards. In this context, "down" denotes the direction of gravity.

"Up" in a corresponding manner denotes the opposite direction to gravity. Accordingly, the device can preferably be configured to be aligned with the first end upwards during use of the device.

The device comprises a housing in which the individual elements of the device described herein can be arranged. The housing comprises an interior in which a holder for receiving a glass ampule is arranged.

The device is configured to receive a glass ampule. A glass ampule is a container made of glass which delimits a liquid contained therein in a gas-tight and liquid-tight manner. Glass ampules typically comprise a base body having a substantially cylindrical shape. The glass ampules described herein preferably comprise an ampule head which is connected by an ampule neck to the remaining glass body, i.e., the main body, of the glass ampule. The ampule neck has a smaller diameter than the main body. The ampule neck can comprise a predetermined breaking point, wherein the ampule head can be separated from the glass ampule by being broken off at said predetermined breaking point. The predetermined breaking point therefore defines an opening from which the liquid can flow out of the glass ampule after the ampule head has been broken off. The predetermined breaking point is preferably annular. The inner diameter of the predetermined breaking point can preferably be 4 to 7 mm, for example 5 to 6 mm. A diameter of the predetermined breaking point of more than 4 mm can facilitate the flow of the liquid located in the glass ampule. This is in particular the case when the glass ampule is arranged at an angle of 20° to 50° to the perpendicular (i.e., in the direction of gravity) during use of the device described herein. Therefore, in one embodiment, the device is configured to break open and empty a glass ampule at an angle of 20° to 50° to the vertical, wherein the inner diameter of the predetermined breaking point of the glass ampule is 4 to 7 mm, for example 5 to 6 mm.

The device according to the invention comprises a holder for receiving such a glass ampule. The holder can facilitate a permanent mounting of a glass ampule in the device. The holder can, for example, be configured to fix a commercially available glass ampule in a force-fitting or form-fitting manner, so that the glass ampule can be positioned immovably in the holder. After being received in the holder, the glass ampule can preferably only be moved within the device by means of the plunger. For this purpose, the holder can have a locking mechanism for fixing a glass ampule. For example, the device for holding a glass ampule can be equipped with an elastic lug or strut which, for example, can be arranged in the direction of the first end of the device. The device can furthermore have a collar which, for example, can be arranged in the direction of the second end of the device. The collar can be dimensioned such that the ampule head can be pushed through the collar, wherein the collar retains the base body of the ampule. A glass ampule can, for example, be held in the holder between such a collar and a lug or strut, or a comparable element for this purpose.

The device also comprises a projection. The projection is designed and configured to break open a glass ampule that can be received in the holder. For this purpose, the projection can be arranged in the housing in such a way that it limits the free movement of a glass ampule that can be received in the holder. In particular, the projection can be arranged such that the head of a glass ampule that can be received in the holder collides with the projection when the glass ampule is moved within the device toward the second end of the device. The projection can extend, for example, from the edge of the housing toward the center of the interior of the housing.

The device furthermore comprises an outlet in order to discharge liquid from the interior of the housing to the outside. The outlet can comprise an opening, a nozzle, a tube or a hose line. Alternatively or additionally, the outlet can also comprise an adapter for connection to a container with bone cement powder.

The device furthermore comprises a plunger movably arranged in the housing. This plunger is designed and configured to break open a glass ampule that can be received in the holder by the pressure of the glass ampule against the projection. The plunger can move the holder in the direction of the projection in order to break the head of the glass ampule off from the base body of the glass ampule. Furthermore, the plunger is designed and configured to pump a liquid from the glass ampule, which was broken open as described above, out of the outlet of the housing.

Accordingly, the plunger can carry out two functions, namely the breaking open of a glass ampule which can be received in the device, and the dispensing of the liquid contained in such a glass ampule from the device.

The device preferably furthermore has a handle which allows a user to manually grip and move the plunger. The handle can be arranged, for example, at the first end of the device, preferably at the opposite end to the outlet of the device.

In a preferred embodiment, the device has a valve. The valve can be configured to allow air to flow into the housing from the outside. Furthermore, the valve can be configured to pump a liquid from a glass ampule, which was broken open in the device, out of the housing by the pressure of the plunger onto the air flowing into the housing. The valve can have a filter in order to prevent dust or germs from entering the device from the outside.

The valve can preferably be a one-way valve, i.e., a valve which is permeable to air in one direction and impermeable to air in another direction. The valve can be, for example, a ball valve, lip valve or plate valve.

The device can furthermore comprise a receptacle. The receptacle can be arranged in the housing and can be configured to receive a portion of a glass ampule broken off by the effect of the plunger. The receptacle is preferably dimensioned to be sufficiently large so that the ampule head of a glass ampule, which can be received in the device, can rotate laterally by approximately 90°, and the liquid contained therein can exit from the ampule head without completely breaking the ampule head itself. Examples of such a receptacle are described in EP2404864B1. The height and cross section of the receptacle are preferably at least as large as the height of the ampule head up to the predetermined breaking point, so that the receptacle is suitable for facilitating a rotation of the broken-off ampule head in the receptacle, as described in more detail in EP2404864B1.

In one embodiment, the device furthermore comprises a screen which is arranged adjacently to the receptacle. The screen is preferably configured to retain fragments from a glass ampule, which was broken open in the device, for example an ampule head, in the device. As a result, for example, the bone cement produced by means of the device can be prevented from being contaminated by glass fragments. The screen can be, for example, a metal wire mesh or a mesh made of a plastic material. The screen can also be a sheet made of metal or plastic with expediently dimensioned holes. Furthermore, open-pore foams, such as Porex, can be used. Preferably, the screen should be made of a material which is not attacked by the liquid located in a glass ampule that can be received.

In a further embodiment, the device furthermore has a collection region in order to receive liquid from a glass ampule broken open in the device. The collection region is preferably fluidically connected to the holder, so that liquid can flow out of a glass ampule, which can be received in the holder, into the collection region. The liquid can preferably flow from the direction of the first end of the device toward the second end of the device. The collection region can be arranged and configured to receive a liquid from a glass ampule broken open in the device and to guide it to the outlet of the device. The collection region can be delimited from the receptacle by a screen as shown above, wherein the sieve can form a fluid-conducting connection between the receptacle and the collection region.

In one embodiment, the device is designed and configured for mixing bone cement. For this purpose, the device furthermore preferably contains a powder component for preparing a bone cement. This powder component can be arranged in a container, wherein the container can be fillable, via the outlet, with liquid from a glass ampule broken open in the device. The outlet can be connectable to the container by means of an adapter, for example by a snap or screw connection. In order to mix the liquid and the powder component, a mixing element, for example a mixing rod, can furthermore be provided which enables the liquid and the powder component to be mixed. The mixing rod can comprise a handle, a rod and a mixing disc. In one embodiment, the outlet is therefore designed and configured to connect to a container. In this case, the container can preferably be configured to receive a powder component of a bone cement.

In one embodiment, the device comprises a first end and a second end, wherein the first end is arranged opposite the second end. The plunger is preferably arranged at the first end. This preferably relates to a portion of the plunger which forms a grip region for gripping and manually moving the plunger. This grip region is also referred to herein as "handle." The outlet is preferably arranged at the second end.

In one embodiment, the outlet defines a longitudinal axis L of the device. If the device, as shown for example in FIG. 1, has a substantially straight shape, the handle and the outlet can, for example, lie in a line which defines the longitudinal axis L. If the device has a different shape, the longitudinal axis L is defined by the shortest connection of the collection region to the outlet. The device is preferably configured to dispense a liquid along said longitudinal axis L. Accordingly, the longitudinal axis L corresponds to the direction in which a liquid flows out of the collection region and through the outlet when the device is in operation. The holder can preferably be arranged at an angle $\alpha$ of 0° to 50° with respect to the longitudinal axis L. The angle $\alpha$ is formed by the longitudinal axis L and a straight line G which corresponds to the direction of movement of the plunger (see also FIG. 9 by way of example). This allows a liquid to flow from a glass ampule received in the holder into the collection region and through the outlet when the device is aligned with the outlet (i.e., in the direction of gravity). The angle $\alpha$ can be, for example, 0° to 10°, 0° to 20°, 0° to 30°, 10° to 20°, 15° to 30°, or 0° to 40°.

In one embodiment, the device is designed and configured to pump the entire contents of a glass ampule, which can be received or has been received in the holder, out of the outlet of the housing with a single stroke of the plunger. This can be achieved in particular by the fact that the stroke volume of the device is dimensioned to be sufficiently large in relation to the volume of a liquid to be dispensed in the glass ampule, for example at least the same size.

In one embodiment, a glass ampule is fastened or fixable in the holder in a force-fitting, form-fitting or integrally bonded manner. A glass ampule can, for example, be fixable or fastened in the device by adhesive bonding or clamping. As shown above, a glass ampule can be held by a collar, for example in the region of the ampule neck, and at the same time can be held under tension at the opposite floor of the ampule by a locking mechanism, for example a strut, a projection or the like, as is illustrated by way of example in the figures.

In one embodiment, the device is designed and configured for simultaneously breaking open and dispensing liquid from two glass ampules. In one embodiment, the device is configured to break open two glass ampules simultaneously with the aid of a single plunger, or with the aid of two connected plungers, and to dispense the liquid contained therein from the device.

In one embodiment, the device contains a glass ampule. The glass ampule can thereby be accommodated in the holder, as explained above. The glass ampule can contain a liquid, for example a monomer solution for producing a bone cement, preferably a PMMA bone cement.

If the device contains both a glass ampule with a liquid and a second component, for example a liquid and a powder for producing bone cement, or generally all starting materials for the intended purpose of the device, the device can also be referred to as a "full-prepacked mixing system." It is accordingly immediately ready for use for producing bone cement without further starting materials having to be added. The device serves in particular for storing the contained components and for mixing and dispensing bone cement, in particular polymethylmethacrylate bone cement. However, other fields of application in medical or non-medical fields are also conceivable in which a liquid is to be dispensed from a glass ampule.

A further aspect relates to a kit comprising a device according to the invention and a mixing cartridge having a powder component for producing bone cement. In one embodiment, the device comprises a connecting element to connect the device to the mixing cartridge. The connecting element can comprise a clamp in order to connect the housing of the device to the housing of the mixing cartridge. The kit can also comprise an adapter for connecting the outlet of the device to the mixing cartridge. A mixing cartridge is a closed container for mixing bone cement. For this purpose, the mixing cartridge can comprise a mixing rod which enables manual or machine mixing of the liquid and of the powder component. The mixing rod can, for example, comprise a handle which can be arranged on the outside of the mixing system. The mixing rod can further comprise a rod which connects the handle to a sheet arranged within the mixing system. The sheet can be moved within the interior of the hollow cylindrical cartridge by a user of the mixing system with the aid of the handle in order to thereby mix the liquid with the powder component. The mixing rod can be removed from the mixing cartridge by means of a screw connection.

A further aspect relates to a method for dispensing a liquid from a glass ampule using a device as described above, wherein the method comprises the following steps,

- fixing the glass ampule in a holder of the device;
- breaking open the glass ampule by pressing the glass ampule against a projection of the device with the aid of a plunger of the device;
- dispensing the liquid from the broken-open glass ampule through an outlet of the device by pumping with the aid of the plunger.

The liquid is preferably a monomer liquid for preparing a bone cement. The method is preferably a method for producing bone cement. The method is preferably carried out completely in vitro i.e., outside the human body.

One aspect of the invention relates to a mixing system, preferably a mixing system for bone cement, which comprises a device described herein. Such a mixing system can comprise two components for producing bone cement, for example a monomer liquid and a powder component for producing PMMA bone cement.

An exemplary mixing system comprises, for example, a device described herein, and also a mixing unit, comprising a hollow cylindrical cartridge having an interior, wherein a bone cement powder is arranged in the interior, and a cartridge head, which fluidically closes the interior at a proximal cartridge end, and a conduit means which fluidically connects the interior of the mixing unit to the outlet of the device, wherein the conduit means extends through a cartridge head duct of the cartridge head of the mixing unit, and the conduit means and the cartridge head duct form a form-fitting connection.

In one embodiment, the mixing system comprises, for example, a housing,

- a holder arranged in the housing for receiving a glass ampule,
- a projection arranged in the housing and being designed and configured to break open a glass ampule which can be received in the holder,
- an outlet for dispensing a liquid from the housing, and
- a plunger movably arranged in the housing, wherein the plunger is designed and configured to break open a glass ampule, which can be received in the holder, by the pressure of the glass ampule against the projection, and to pump the liquid from the glass ampule out of the outlet of the housing,
- a mixing unit comprising a hollow cylindrical cartridge having an interior space, wherein a powder component is arranged in the interior,
- a cartridge head which fluidically closes the interior at a proximal cartridge end,
- and a conduit means which fluidically connects the interior of the mixing unit to the outlet of the device, wherein the conduit means extends through a cartridge head duct of the cartridge head of the mixing unit and the conduit means and the cartridge head duct form a form-fitting connection.

According to this embodiment, a glass ampule can be broken open by means of the plunger, and the liquid contained therein can be pumped into the mixing unit with the aid of a conduit means.

The conduit means can, for example, be a hose connection which fluidically connects individual elements of the mixing system to one another within the mixing system. The conduit means can preferably comprise or consist of an elastic polymer. The elastic polymer can comprise, for example, a silicone, PE, PP, PU, PA or FEP.

In a further embodiment, the mixing system contains

- a housing,
- a holder arranged in the housing for receiving a glass ampule,
- a projection arranged in the housing and being designed and configured to break open a glass ampule which can be received in the holder,
- an outlet for dispensing a liquid from the housing, and
- a plunger movably arranged in the housing, wherein the plunger is designed and configured to break open a glass ampule, which can be received in the holder, by the pressure of the glass ampule against the projection, and to pump the liquid from the glass ampule out of the outlet of the housing,
- a mixing unit comprising a hollow cylindrical cartridge having an interior space, wherein a powder component is arranged in the interior,
- a cartridge head which fluidically closes the interior at a proximal cartridge end,
- and a hollow-cylindrical adapter which is designed to reversibly connect the proximal cartridge end to the outlet.

According to this embodiment, a glass ampule can be broken open by means of the plunger, and the liquid contained therein can be pumped into the mixing unit with the aid of a reversibly connectable adapter.

In a further embodiment, the mixing system contains

- a housing,
- a holder arranged in the housing for receiving a glass ampule,
- a projection arranged in the housing and being designed and configured to break open a glass ampule which can be received in the holder,
- an outlet for dispensing a liquid from the housing, and
- a plunger movably arranged in the housing, wherein the plunger is designed and configured to break open a glass ampule, which can be received in the holder, by the pressure of the glass ampule against the projection, and to pump the liquid from the glass ampule out of the outlet of the housing,
- a mixing unit comprising a hollow cylindrical cartridge having an interior space, wherein a powder component is arranged in the interior,
- a cartridge head which fluidically closes the interior at a proximal cartridge end,
- a foot section which is configured as a contact surface for the mixing system,
- a cartridge head which is connectable or is connected to the foot section, an injection nozzle which is arranged in the foot section and extends into the cartridge head, and a conduit means which is fluidically connected to the injection nozzle.

According to this embodiment, a glass ampule can be broken open by means of the plunger, and the liquid contained therein can be pumped into the mixing unit via an injection nozzle with the aid of a conduit means.

The mixing system is preferably a "full-prepacked mixing system" as described above. Such a mixing system can be provided in a sterile and hermetically sealed packaging. The mixing system itself and the contained bone cement components can also be provided in a sterile manner.

As previously described in more detail herein, by the movement of the plunger, a glass ampule received in the holder can be broken open by the pressure against the projection in order to release a liquid contained therein, for example a monomer liquid for preparing bone cement, from the glass ampule. Furthermore, due to the movement of the plunger, this liquid can be pumped through the outlet and the conduit means into the mixing unit, and mixed there with the bone cement powder arranged there in order to form a bone cement from the liquid and the powder component. For this purpose, the liquid and the powder component can continue to be mixed with one another in the mixing unit. For this purpose, the mixing system can comprise a mixing rod which enables manual or machine mixing of the liquid and of the powder component. The mixing rod can, for example, comprise a handle which can be arranged on the outside of the mixing system. The mixing rod can further comprise a rod which connects the handle to a sheet arranged within the mixing system. The sheet can be moved within the interior of the hollow cylindrical cartridge by a user of the mixing system with the aid of the handle in order to thereby mix the liquid with the powder component.

The mixing system may further comprise a screen to retain fragments of the broken-open ampule, as described in more detail above.

The mixing system can furthermore comprise a receptacle, as described above. The receptacle can be arranged in the housing and can be configured to receive a portion of a glass ampule broken off by the effect of the plunger. The receptacle is preferably dimensioned to be sufficiently large so that the ampule head of a glass ampule broken open in the device, can rotate laterally by approximately 90°, and the liquid contained therein can exit from the ampule head without completely breaking the ampule head itself.

EXAMPLES

The invention is further illustrated below using examples which are, however, not to be understood as limiting. It will be apparent to a person skilled in the art that other equivalent means may be used similarly in place of the features described here.

FIG. 1 shows by way of example a lateral cross-sectional view of a first embodiment of a device 100 according to the invention. The device comprises a first end 111, which points upwards during use as intended, and a second end 112 which is oriented downwards during use as intended. The device comprises a housing 101 having an interior 110 in which a holder 102 is arranged. A glass ampule 201 can be received in the holder 102. The glass ampule 201 comprises an ampule neck 203 having a predetermined breaking point 204 at which the ampule head 205 can be detached. The glass ampule 201 is arranged with the ampule head in the direction of the second end 112 and contains a liquid 202, for example, a monomer solution for producing bone cement. The glass ampule 201 is held in a holder 102 which in this example is shaped like a collar. The device comprises at the first end 111 a handle 114 which facilitates the manual movement of a plunger 105 arranged within the interior 110. The handle 114 is operatively connected to the plunger 105 for this purpose. At the first end 111, the device further comprises a valve 106 which facilitates the inflow of air into the interior 110 but does not allow any air to reach the outside from the interior 110. In the interior 110, a projection 103 is furthermore arranged which facilitates a breaking off of the ampule head 205 when the ampule 201 is moved with the aid of the plunger 105 in the direction of the second end 112. The projection 103 limits the possible travel path of the plunger 105 in the direction of the second end 112. From the projection 103 in the direction of the second end 112, a receptacle 107 is furthermore arranged in which a broken-off ampule head 205 can be received. The receptacle 107 is preferably large enough to prevent the ampule head from tipping laterally 205 so that the liquid 202 from the ampule head 205 can run out. The receptacle 107 is limited in the direction of the second end 112 by a screen 108, which can retain glass fragments of a broken-open glass ampule 201 within the device, but which allows the liquid 202 to pass through in a collection region 109 which is adjacent to the screen 108 in the direction of the second end 112. The liquid 202 can collect in the collection region 109, in order to be dispensed out of the device by the pumping effect of the plunger 105 out of an outlet 104 along a longitudinal axis of the device L.

Figure 2:
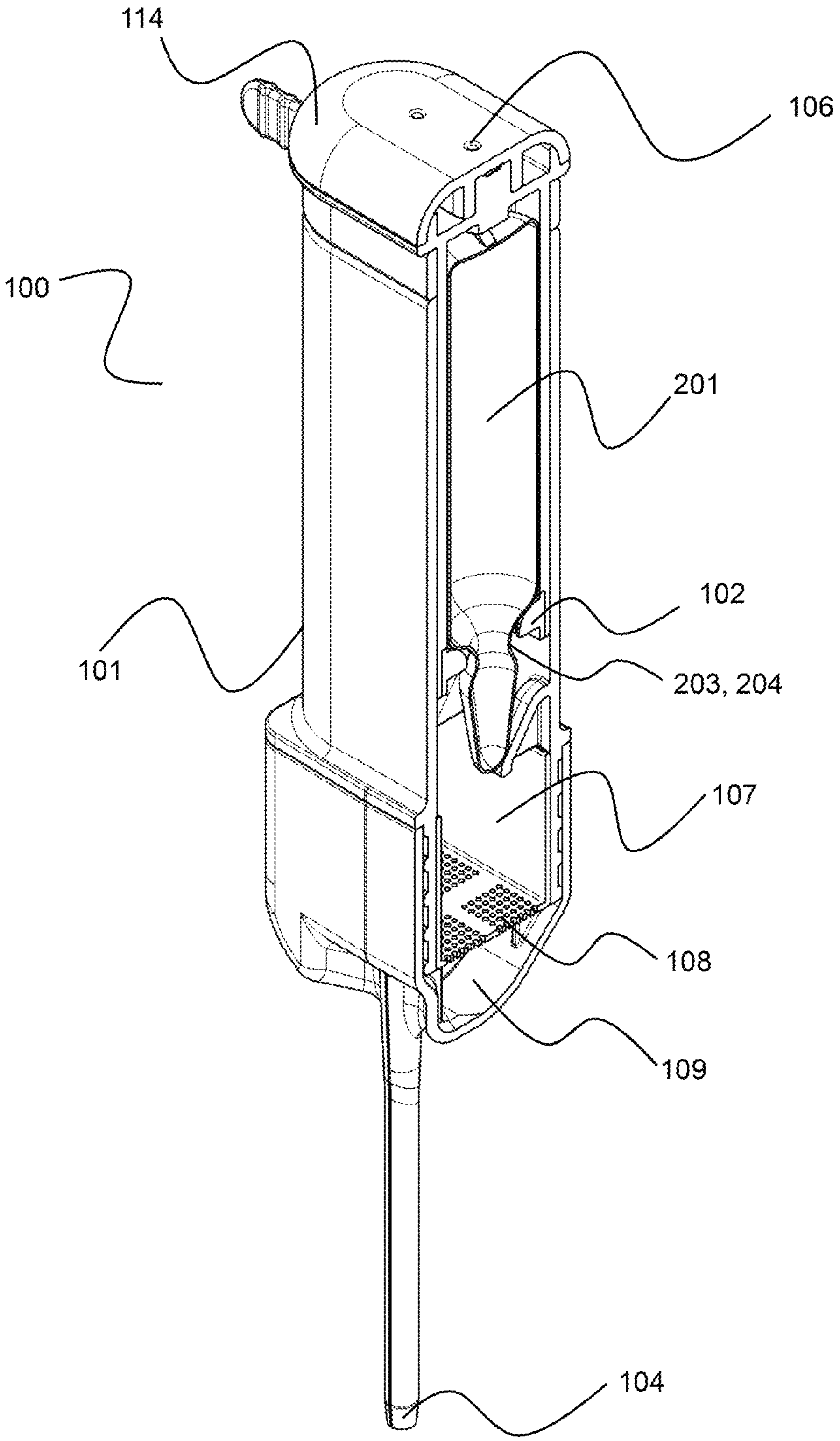
Fig. 2 illustrates an isometric cross-sectional view of a device in accordance with one embodiment.

FIG. 2 shows an isometric cross-sectional view of an embodiment of a device 100 according to the invention. Two valves 106 are arranged at the handle region 114. Within the housing 101, a glass ampule 201 is arranged in a holder 102, wherein the ampule neck 203 with the predetermined breaking point 204 is held within a collar of the holder 102. A screen 108 is located below the glass ampule, which screen separates the receptacle 107 arranged directly below the ampule from the collection region 109. The collection region 109 tapers to an outlet 104 which is tubular here.

Figure 3:
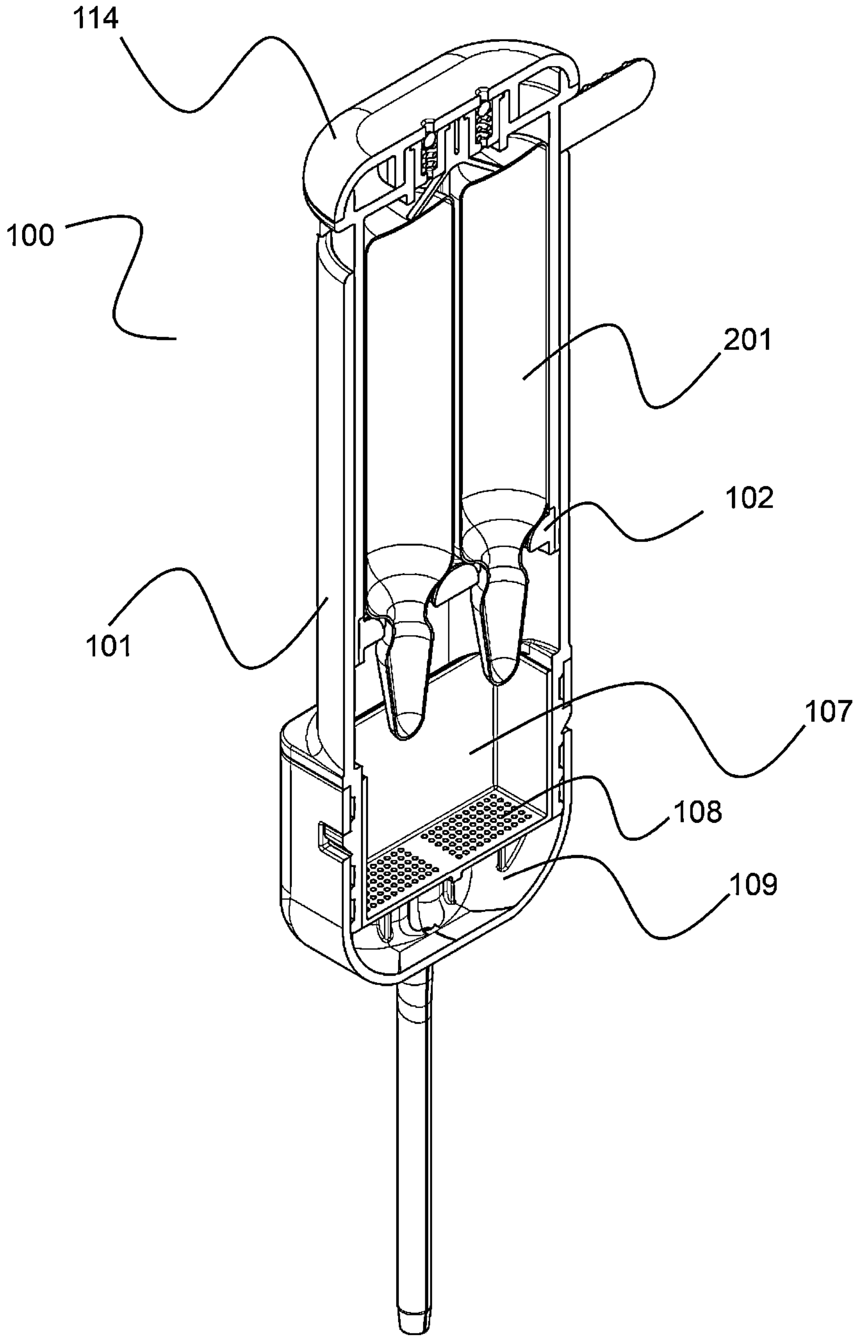
Fig. 3 illustrates an isometric cross-sectional view of a device in accordance with one embodiment.

FIG. 3 shows a further embodiment of a device according to the invention 100 which is configured for simultaneously breaking open two glass ampules 201. Within the housing 101, two glass ampules 201 are held in parallel, and are each formed by a holder 102. Below the glass ampules 201, a receptacle 107 is located for receiving the broken-off ampule heads of the two ampules 201. Glass fragments of the ampules can be retained in a screen 108 below the receptacle 107, while the liquid can flow out of the two glass ampules through the screen 108 into the collection region 109.

FIGS. 4*a* to 4*f* show a method in which a device according to the invention for dispensing a liquid from a glass ampule 201 is used. The direction of movement of the plunger is illustrated by arrows in each case.

Figure 4A:
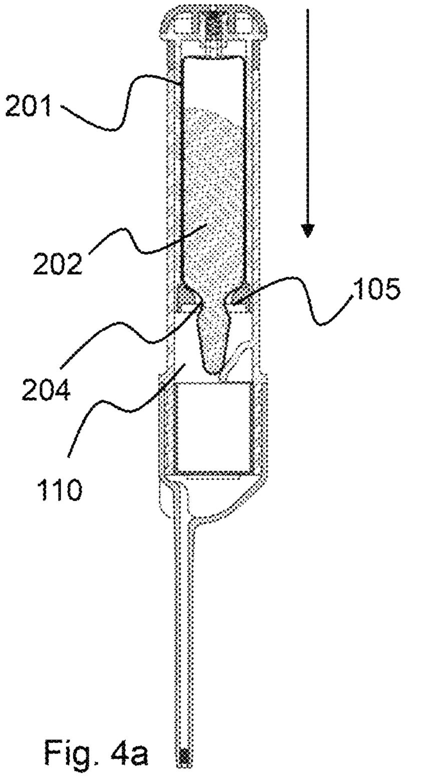
Fig. 4*a* to 4*f* illustrate a method for using a device for dispensing a liquid from a glass ampule in accordance with one embodiment.

FIG. 4*a* shows how, by movement of the plunger 105, a glass ampule 201, which is fixed by a holder 105 within the device, is moved in the direction of the projection 103 in order to break off the ampule head 205 at the predetermined breaking point 204.

Figure 4B:
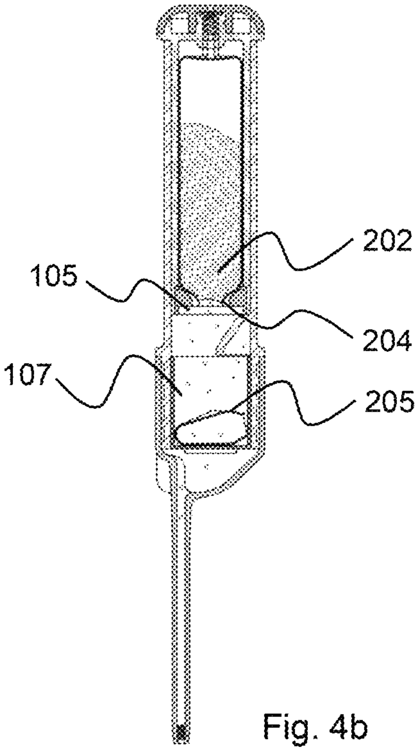

FIG. 4*b* shows the broken-off ampule head 205 which has fallen into the receptacle 107, wherein the opening of the ampule head points toward the side in order to let the liquid 202. The plunger 105 is inserted into the interior 110 up to the position of the projection 103.

Figure 4C:
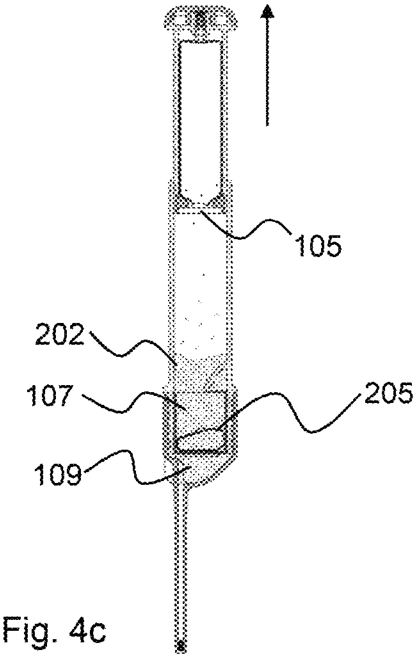

FIG. 4*c* shows the device in a position in which the plunger 105 is partially pulled out from the interior 110 in order to fill the interior 110 with air. The liquid 202 of the broken-open ampule has leaked into the interior 110, in particular into the collection region 109.

Figure 4D:
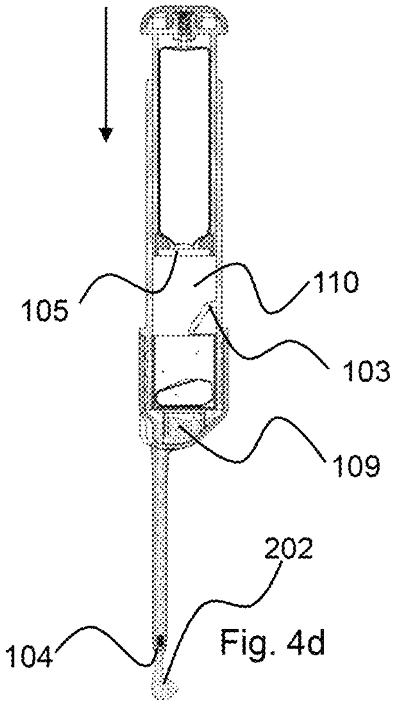

FIG. 4*d* shows how, by inserting the plunger 105 into the interior 110, pressure is built up in order to extract the liquid 202 from the collection region 109 through the outlet 104 out of the device.

Figure 4E:
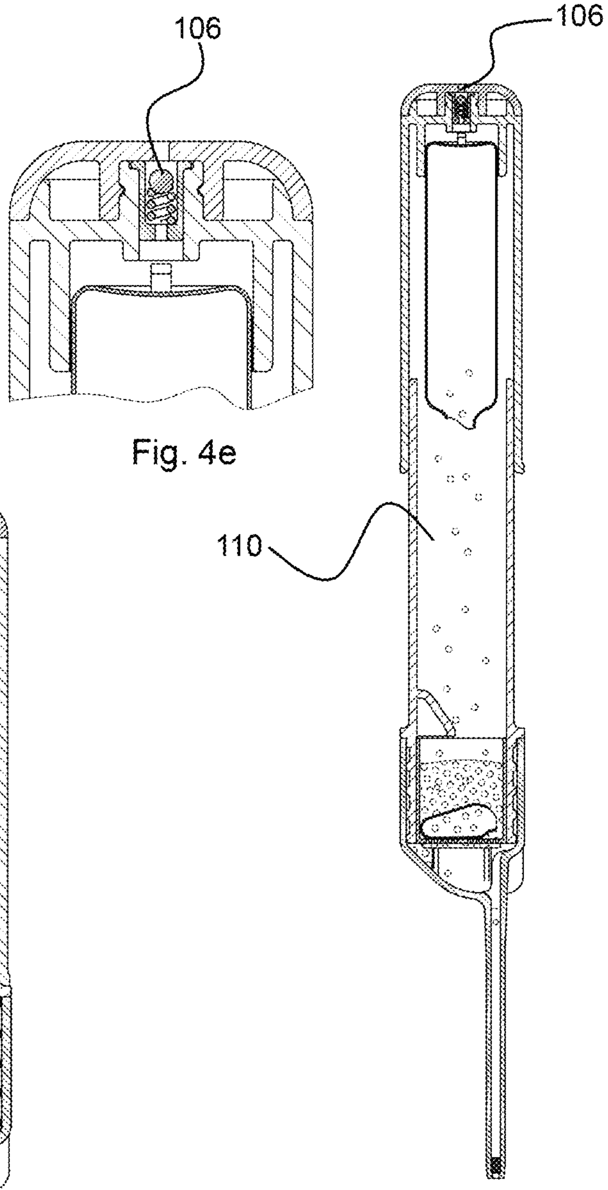

FIG. 4*e* shows an open valve 106, while the plunger 105 is pulled out of the device in order to pump air into the interior 110.

Figure 4F:
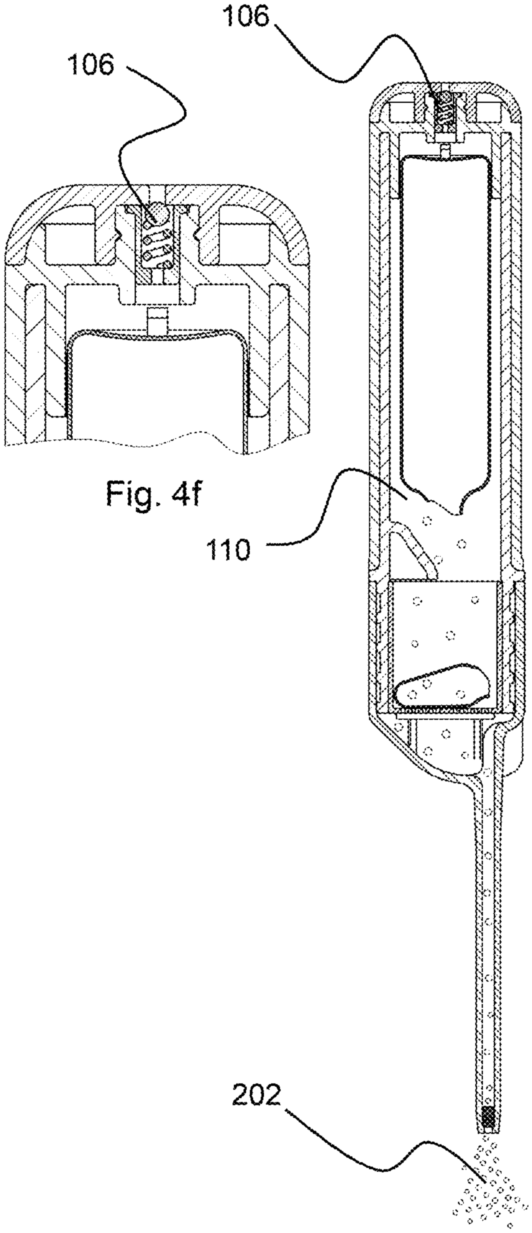

FIG. 4*f* shows a closed valve 106, while the plunger 105 is inserted into the device in order to pump liquid 202 out of the device.

Figure 5:
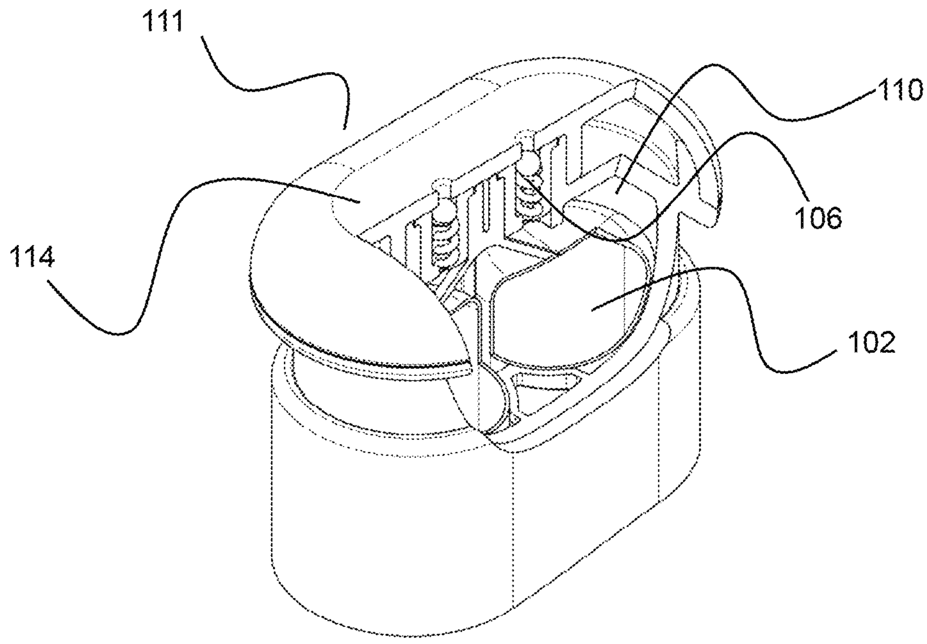
Fig. 5 illustrates an isometric cross-sectional view of a detail of a device in accordance with one embodiment.

FIG. 5 shows an isometric cross-sectional view of a detail of a device according to the invention in the region of the first end 111 in an isometric cross-sectional view. Within the handle region 114, two handles 106 are arranged which allow air to enter into the interior space 110 in which a holder 102 is arranged.

Figure 6:
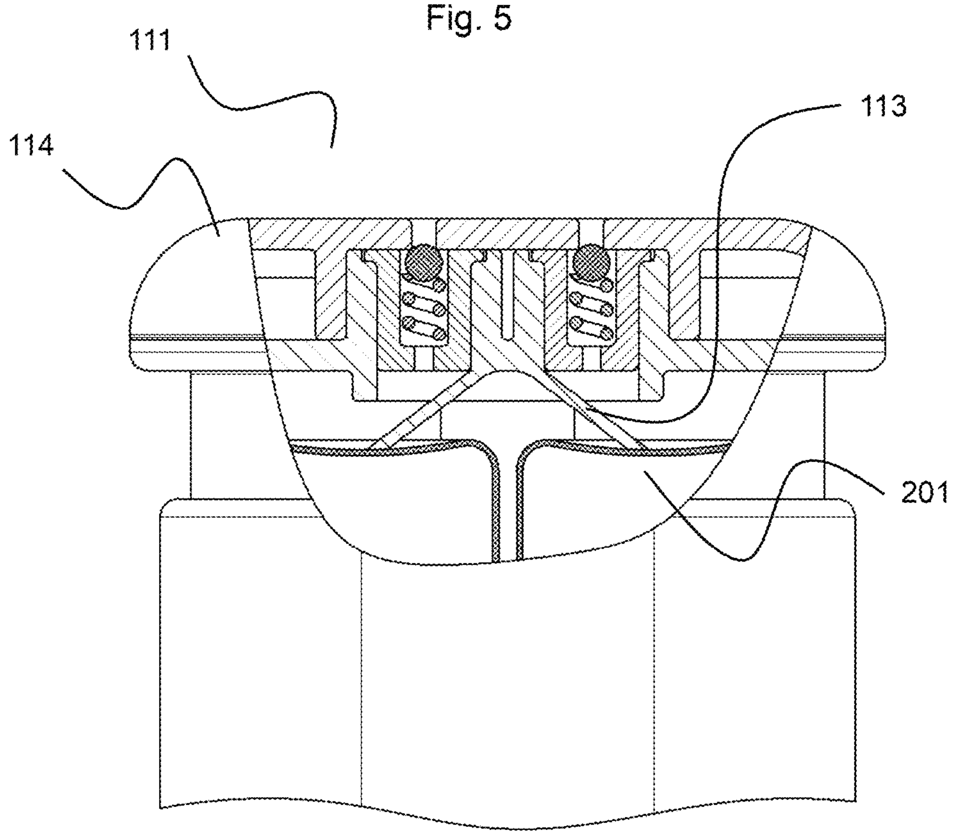
Fig. 6 illustrates a cross-sectional view of a detail of a device in accordance with one embodiment.

FIG. 6 shows a cross-sectional view of a detail of a device according to the invention in the region of the first end 111. Adjacent to the handle region 114, struts 113 are arranged as a locking mechanism for the glass ampules 201 in order to fix them.

Figure 7:
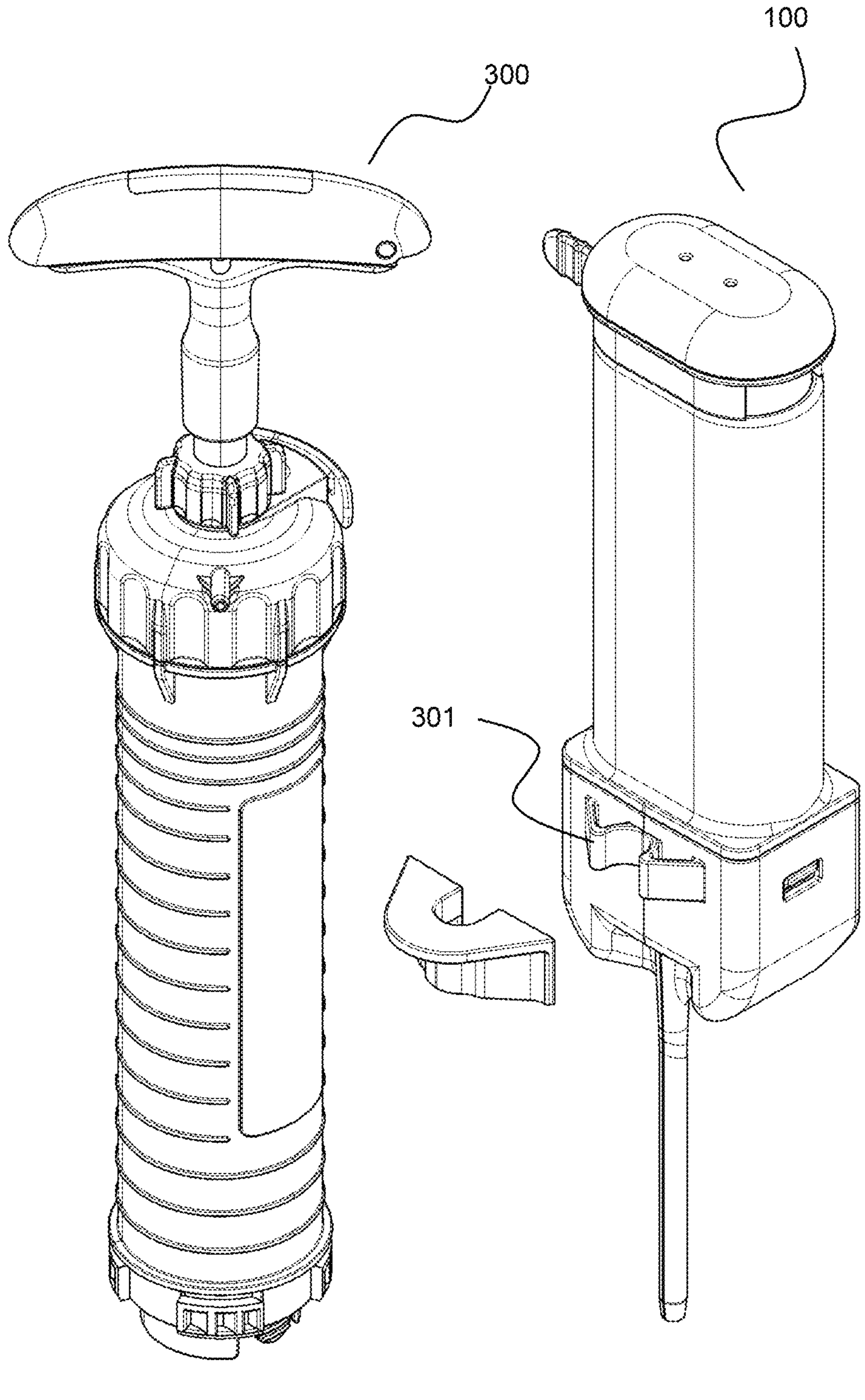
Fig. 7 illustrates a kit of a device and a mixing cartridge in accordance with one embodiment.

FIG. 7 shows a kit of a device according to the invention 100 and a mixing cartridge 300 having a powder component for producing bone cement. In this embodiment, the device 101 comprises a connecting element 301 in order to connect the device 100 to the mixing cartridge 300. The connecting element is designed here as a two-part clamp which can be attached to the rod of the mixing rod of the mixing cartridge.

Figure 8:
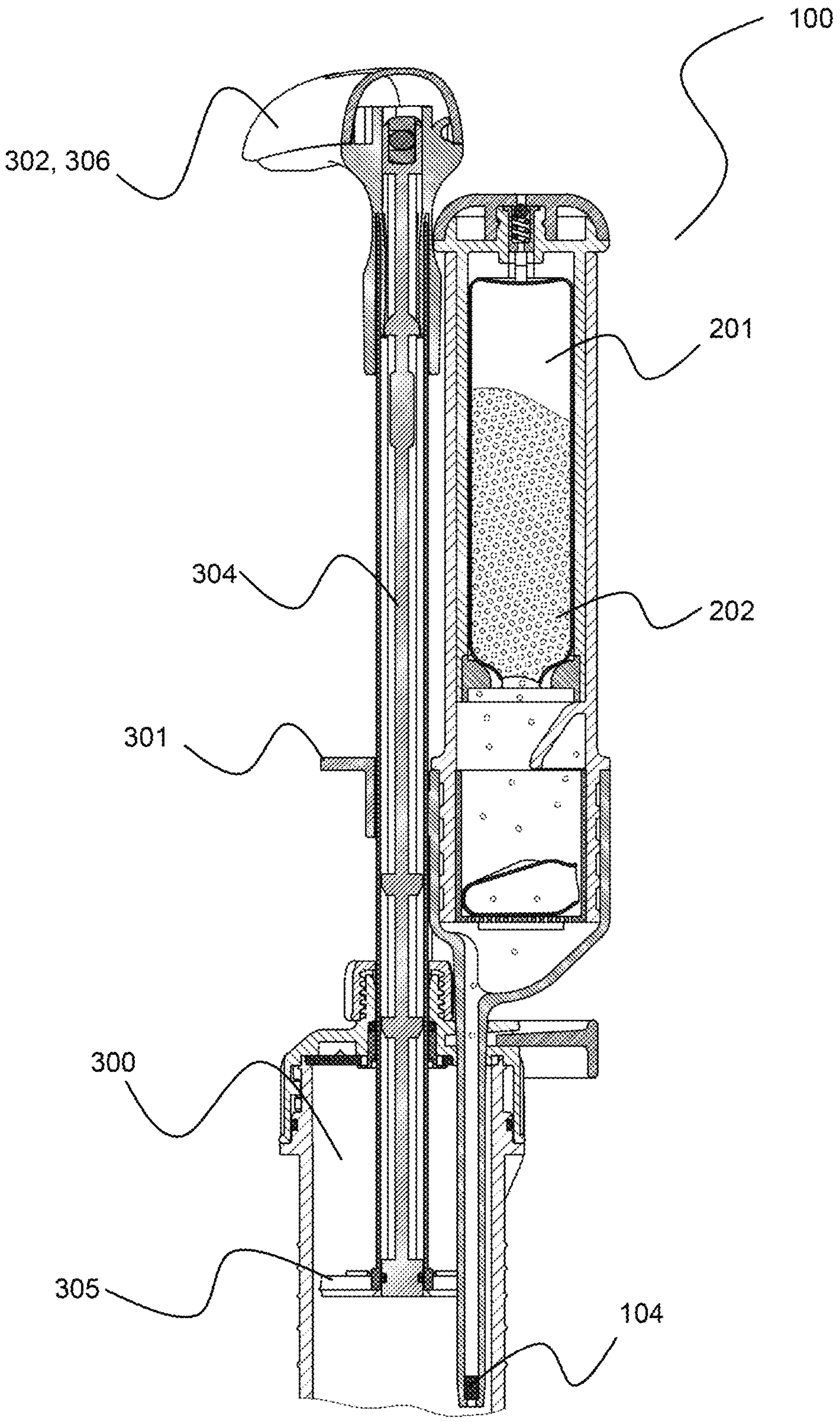
Fig. 8 illustrates a device and a connecting element in accordance with one embodiment.

FIG. 8 shows a device according to the invention 100, which with the aid of a connecting element 301 is connected to a cartridge 300, wherein the outlet 104 of the device 100 projects into the interior of the cartridge 300 in order to pump a liquid 202 out of a glass ampule 201 into the container 300. The cartridge 300 comprises a mixing rod 302 having a rod 304, a handle 306 and a mixing disc 305. The cartridge 300 contains a powder component for producing a PMMA bone cement. The mixing rod 302 can be held on the handle 306 and moved by a user, wherein the mixing disc 305 can thereby be moved within the interior of the cartridge 300 in order to mix the powder component with the liquid 201. The handle 306 is connected for this purpose to the mixing disc 305 via a rod 304.

Figure 9:
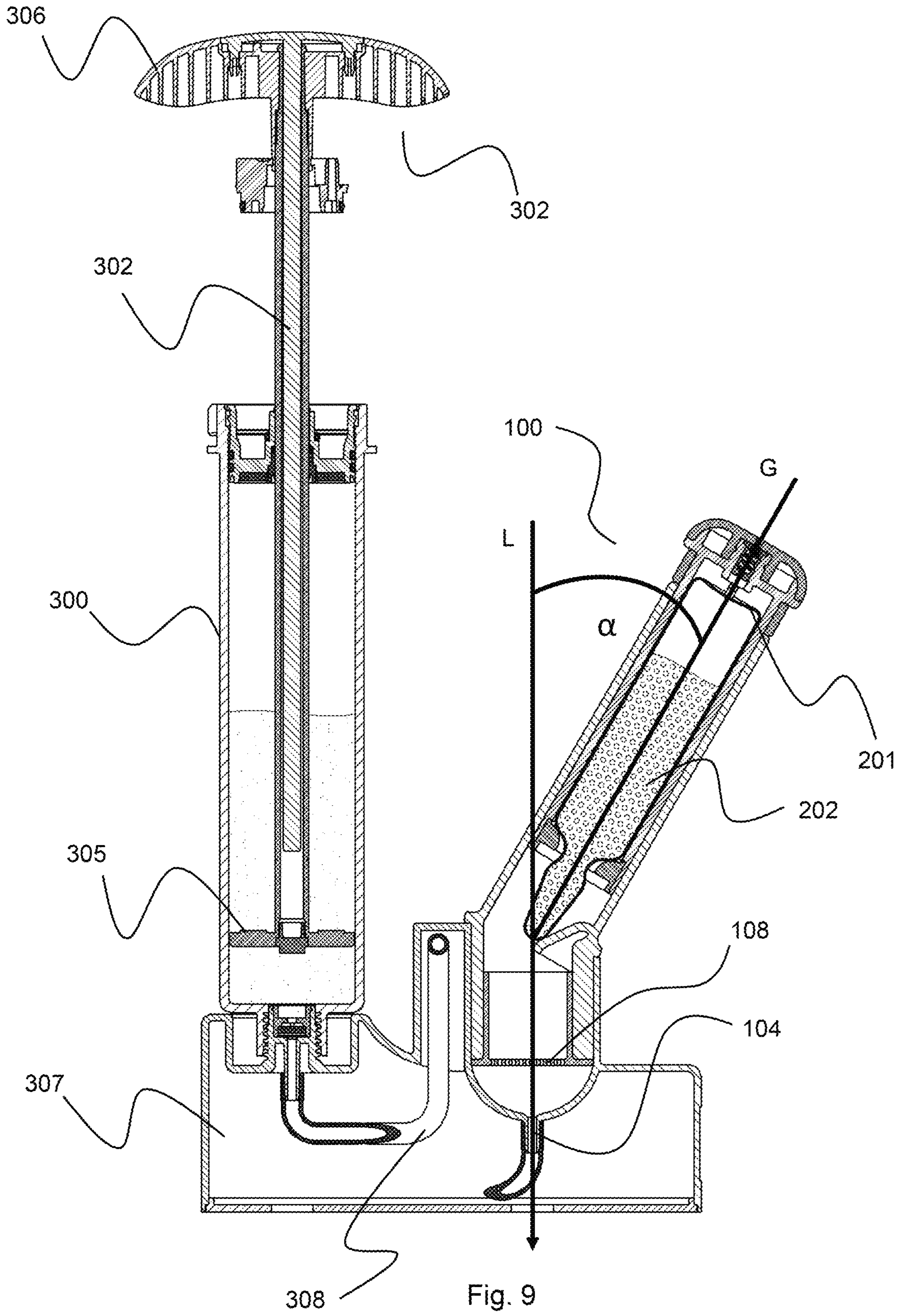
Fig. 9 illustrates a mixing system with a device in accordance with one embodiment.

FIG. 9 shows a further embodiment of a mixing system comprising a device according to the invention 100 which is connected to a cartridge 300 having a powder component. The mixing system comprises a foot section 307 which is configured as a contact surface for the mixing system and holds the device 100 and the cartridge 300 in position relative to one another. The outlet 104 of the device 100 is connected to the interior of the cartridge 300 via a line element 308 in order to pump liquid 202 from a glass ampule held in the device 201 out of the device 100 into the container 300. In the example shown here, the ampule holder 102 is angled: the straight line G, which runs along the central axis of the glass ampule, forms an angle $\alpha$ with respect to the longitudinal axis L that is defined by the outlet 104 and the screen 108. This angle is approximately 0° to 50° so that the liquid 202 from the broken-open ampule 201 can be moved into the collection region 109 by the effect of gravity. Thereafter, the liquid 202, by movement of the plunger 105, can be pumped out of the device 100 via the outlet 104 and the line element 308 into the cartridge 300. In the mixing system shown here, the two components for bone cement are each introduced into separate and closed spaces, namely a powder component in the container 301 and a liquid 202 in the device 100. The mixing system is thus an example of a ready-to-use "full-prepacked mixing system" in which the user does not have to additionally add these two components.

LIST OF REFERENCE NUMERALS

100 Device
101 Housing
102 Holder
103 Projection
104 Outlet
105 Plunger
106 Valve
107 Receptacle (for glass breakage)
108 Screen
109 Collection region (for liquid)
110 Interior of the housing
111 First end
112 Second end
113 Locking mechanism (for glass ampule)
114 Handle region
201 Glass ampule
202 Liquid
203 Ampule neck
204 Predetermined breaking point
205 Ampule head
300 Container (for powder component)
301 Connecting element
302 Mixing rod
304 Rod
305 Mixing disc
306 Handle
307 Foot section
308 Line element
L Longitudinal axis of the device (dispensing direction of the liquid)
G Straight line (central axis of the holder or ampule)
$\alpha$ Angle between longitudinal axis L and straight line G

What is claimed is:

1. A device for dispensing a liquid from a glass ampule, comprising:
- a housing;
- a holder arranged in the housing for receiving a glass ampule with a liquid;
- a projection which is arranged in the housing and is designed and configured to break open a glass ampule which can be received in the holder;
- an outlet for dispensing a liquid from the housing;
- a plunger arranged movably in the housing, wherein the plunger is designed and configured to break open a glass ampule, which can be received in the holder, by pressure of the glass ampule against the projection, and to pump the liquid from the glass ampule out of the outlet of the housing; and
- a valve configured to allow air to flow into the housing from the outside in order to subsequently pump a liquid from a glass ampule broken open in the device out of the housing by the pressure of the plunger onto the air flowing into the housing.

2. The device according to claim 1, wherein the valve is a one-way valve, preferably a ball valve, lip valve, or plate valve.

3. The device according to claim 1, wherein the device further comprises a collection region in order to receive liquid from a glass ampule broken open in the device.

4. The device according to claim 1, wherein the device is designed and configured for mixing bone cement, wherein the device preferably further contains a powder component for preparing a bone cement.

5. The device according to claim 1, wherein the outlet is designed and configured for connection to a container, wherein the container is configured to receive a powder component of a bone cement.

6. The device according to claim 1, wherein the device is designed and configured to pump the entire contents of a glass ampule received in the holder out of the outlet of the housing with a single stroke of the plunger.

7. The device according to claim 1, wherein a glass ampule is fastened or fixable in the holder in a force-fitting, form-fitting or integrally bonded manner, and is fastened or fixable by adhesive bonding or clamping.

8. The device according to claim 1, wherein the device is designed and configured for simultaneously breaking open and dispensing liquid from two glass ampules.

9. The device according to claim 1, wherein a glass ampule is arranged in the holder and comprises an ampule neck having an annular predetermined breaking point, wherein the inner diameter of the predetermined breaking point is 4 to 7 mm.

10. A method for dispensing a liquid from a glass ampule using a device, for example the device recited in claim 1, wherein the method comprises the following steps, fixing the glass ampule in a holder of the device;

breaking open the glass ampule by pressing the glass ampule against a projection of the device with the aid of a plunger of the device; and, dispensing the liquid from the broken-open glass ampule through an outlet of the device by pumping with the aid of the plunger.

11. The device according to claim 1, further comprising a receptacle which is arranged in the housing and is configured to receive a portion of a glass ampule broken off by the action of the plunger.

12. The device according to claim 11, further comprising a screen arranged adjacent to the receptacle and configured to retain fragments from a glass ampule broken open in the device.

13. The device according to claim 1, wherein the device comprises a first end and a second end, wherein the first end is arranged opposite the second end, wherein the plunger is arranged at the first end, and the outlet is arranged at the second end.

14. The device according to claim 13, wherein the outlet defines a longitudinal axis of the device, wherein the device is configured to dispense a liquid along this longitudinal axis, wherein the holder is arranged at an angle $\alpha$ of 0° to 50° with respect to this longitudinal axis.

* * * * *